United States Patent Office 3,672,873
Patented June 27, 1972

3,672,873
SEPARATION OF NICKEL FROM COBALT
David Anthony Huggins, Mississauga, Ontario, Canada, and Walter Curlook, Neuilly, France, assignors to The International Nickel Company, Inc., New York, N.Y.
No Drawing. Filed Mar. 11, 1970, Ser. No. 18,721
Claims priority, application Canada, Mar. 28, 1969, 047,217
Int. Cl. C22b 23/04
U.S. Cl. 75—101 R    29 Claims

ABSTRACT OF THE DISCLOSURE

Directed to a process for separately recovering nickel and cobalt from an aqueous solution containing the same wherein the nickel and cobalt contents are precipitated as reducible compounds, e.g., basic carbonates, separating and drying the resulting precipitates, reducing the compounds at a temperature below about 400° C. and then treating the reduced metal products with carbon monoxide at superatmospheric pressures and a temperature below 100° C. to evolve nickel carbonyl thereby separating the nickel from the cobalt in the reduced product.

---

The present invention relates to the treatment of nickeliferous oxide materials and, more particularly, to the hydrometallurgical and vapometallurgical treatment of nickeliferous oxide ores to recover nickel as substantially pure nickel carbonyl.

"Nickel-containing lateritic ores" or "nickeliferous oxide ores" as used herein refer to the weathered products of olivine and serpentine. These ores are not readily susceptible to concentration by techniques such as flotation or magnetic separation and, therefore, all the mined ore must be treated for nickel recovery. The inability to concentrate these ores has made the recovery of nickel, and sometimes cobalt, quite difficult. For example, in smelting these ores to produce ferronickel or nickel matte large quantities of fuel are required to smelt all the ore to recover only one or two percent of the valuable part of the ore. These processes also suffer in that they provide no effective means of separating nickel and cobalt. In fact, cobalt is often lost when attempting to purify ferronickel or nickel matte.

Nickel has also been recovered from lateritic ores by hydrometallurgical processing. For example, in Cuba, nickel-containing limonitic (high iron) ore is directly leached with sulfuric acid at elevated temperatures with appropriate pressures to limit the amount of iron dissolved. Although this process works reasonably well, it can only be applied to limonitic ores since ores with lower iron contents have larger amounts of magnesium which reacts with the sulfuric acid, greatly increasing the amount of acid required. The crude nickel-cobalt is then directed to a special refining to separate nickel from the cobalt. Caron, at an early date, taught that nickeliferous oxide ores could be selectively reduced and leached with an ammoniacal ammonium carbonate solution. Nickel along with cobalt is recovered from the solution by heating the solution to distill ammonia and carbon dioxide and to precipitate basic carbonates of nickel and cobalt. In large scale practice in Cuba, the cobalt content in the final nickel product, in fact, is limited by and kept within certain specifications by purposely limiting the degree of reduction with a detrimental effect on nickel extraction. Although attempts have been made to provide an extraction process to treat a wide variety of lateritic ores and to recover therefrom a nickel product substantially free of cobalt, none, as far as we are aware has provided such a process.

It has now been discovered that solution containing nickel and cobalt can be treated to separate nickel from cobalt by precipitating reducible nickel and cobalt compounds from the solution, reducing the compounds under special conditions and vapometallurgically treating the reduced compound to produce nickel carbonyl.

It is an object of the present invention to separate nickel from cobalt.

Another object of the present invention is to provide a process for treating a nickel- and cobalt-containing solution to recover nickel and cobalt.

A still further object is to provide an overall process for recovering nickel and cobalt from nickeliferous oxide ores.

An even further object of the present invention is to provide a process for treating nickeliferous ores by a combination of hydrometallurgical and vapometallurgical operations whereby nickel and cobalt are extracted from the ore at an early stage so that the bulk of the ore does not have to be treated during numerous refining operations.

Other objects and advantages will become apparent from the following description.

Generally speaking, the present invention contemplates the treatment of a nickel- and cobalt-containing aqueous solution to separate and recover nickel and cobalt therefrom. The aqueous solution is treated to precipitate the nickel and cobalt content thereof as reducible compounds of these metals, which reducible compounds, after separation and drying, are reduced to metal by heating to a temperature of more than about 200° C. but less than about 400° C. in an atmosphere reducing to nickel oxide. Nickel and cobalt are then separated by carbonylating the reduced compounds with superatmospheric carbon monoxide partial pressures of less than about 15 atmospheres at temperatures below about 100° C. to produce gaseous nickel carbonyl which evolves from the reduced material while the cobalt remains therein for separate recovery.

Any nickel-containing solution can be treated by the process of the present invention. However, the process is most advantageously employed when the nickel-containing solution has a nickel to cobalt ratio of less than about 100:1 since the process provides an effective means of separating nickel from cobalt. Likewise, all nickeliferous materials, including nickeliferous oxide ores, which have nickel to cobalt ratios of less than about 100:1 can be treated to provide nickel- and cobalt-containing solutions which can be treated to separate nickel from cobalt.

The process in accordance with the present invention will most generally be employed in conjunction with a leaching operation, but nickel process solutions derived from other sources, such as electrorefining, can also be treated. The leaching operation can be accomplished with either acid or basic solutions when leaching either sulfide (roasted or unroasted) or oxide ores. Although the process in accordance with the present invention can be employed to separate nickel from iron in materials such as nickel-containing oxidic ores, e.g., nickel-containing lateritic ores, the leaching operation is most frequently selected so that undue amounts of iron are not taken into solution. This is advantageous because dissolution of iron requires the use of additional, and frequently expensive, reagents and iron precipitates often present materials-handling problems in the form of filtration difficulties. However, the presence of iron even in large quantities does not affect the operability of the present process. In carrying out the process in accordance with the present invention a portion of any reduced iron is carbonylated along with the nickel and the two gaseous carbonyls are separated from the cobalt-containing residue; the gaseous carbonyls are then liquified and subjected to distillation; and a very pure nickel carbonyl substantially free of iron and, of course, cobalt is produced. When treating nickeliferous oxide ores the choice of the leaching operation will depend on the nature of the ore. For example, nickel-containing lateritic ores containing more than about 45% iron (and therefore only small amounts of magnesia, not exceeding about 3%) can be directly leached with sulfuric acid at elevated temperatures, e.g., about 230° C. to 260° C. in an autoclave under appropriate pressures to produce an aqueous sulfate solution containing nickel, cobalt and only limited amounts of iron. The sulfate solution can be treated with a base or water-soluble carbonate to precipitate reducible hydroxides or basic carbonates of nickel and cobalt suitable for processing according to the present invention.

Nickel- and cobalt-containing lateritic ores are most advantageously selectively reduced to reduce a preponderant part, e.g., more than about 75%, of the nickel and cobalt and only controlled amounts of iron, e.g., not more than about 3 parts of iron for each part of nickel. The selectively reduced ore is then leached with an ammoniacal ammonium carbonate solution with aeration to dissolve nickel, cobalt and minor amounts of iron. Leaching with ammoniacal ammonium carbonate solutions can be accomplished at temperatures between about 20° C. and 90° C. under appropriate pressures to minimize distillation of ammonia and carbon dioxide. Advantageously, leaching is conducted at temperatures between about 30° C. and 70° C. to maximize the rate of nickel oxidation by more rapid diffusion of oxygen and to minimize the rate of vaporization of ammonia and carbon dioxide. Basic carbonates of nickel and cobalt can be precipitated in preparation for subsequent treatment in accordance with the present invention by distilling ammonia and carbon dioxide from the solution by heating or vacuum degassing or a combination of these steps. This latter process is preferred in that no additional reagents are required for precipitation and the distilled ammonia and carbon dioxide can be recovered for further use in the leaching operation. Other leaching processes can be employed. For example, nickeliferous oxide ores can be selectively reduced and acid leached with aeration to limit the amount of iron taken into solution and after neutralization of pregnant leach liquor a reducible residue of nickel and cobalt can be produced for treatment in accordance with the present process.

One of the important features of the present invention is the precipitation of reducible compounds of nickel and cobalt from aqueous solutions. Precipitates, particularly fresh precipitates emanating from liquid solutions, are quite reactive chemically. For example, precipitates from aqueous solutions can be reduced at temperatures substantially lower than the same compounds produced by pyrometallurgical techniques. Since another feature of the present invention is the reduction of nickel and cobalt compounds at temperatures usually below about 340° C., the importance of precipitating reducible compounds of nickel and cobalt becomes readily apparent. The term "reducible compound" as used herein refers to oxides, hydroxides, carbonates and mixtures thereof. Basic carbonates of nickel and cobalt, as noted hereinbefore, can be formed by distilling ammonia and carbon dioxide from pregnant ammoniacal ammonium carbonate solutions. Such basic carbonates can also be produced by treating nickel and cobalt salt solutions with water-soluble carbonates or bicarbonates, such as sodium carbonate or sodium bicarbonate. Hydroxides of nickel and cobalt can be formed by adding bases, such as sodium hydroxide, potassium hydroxide, ammonium and other hydroxides to acidic aqueous solutions having nickel and cobalt dissolved therein. Oxides of cobalt and nickel can be formed by drying and/or by calcination of the carbonates, basic carbonates, hydroxides or sulfides or nickel and cobalt.

Another important feature of the present invention is the reduction of reducible compounds of nickel and cobalt to metal at temperatures no higher than about 375° C. When reduction is conducted at temperatures above about 400° C. less than about 75% of the nickel is recovered upon subsequent carbonylation as gaseous nickel carbonyl. In order to provide commercially feasible rates of reduction, temperatures of at least about 225° C. are employed in the reduction operation. Any atmosphere which is reducing to nickel oxide can be employed for the reduction operation. Hydrogen, carbon monoxide and mixtures thereof, diluted with inert gases or with oxidizing constituents or in the concentrated state, can be employed. When the reducing atmosphere contains oxidizing constituents, the atmosphere should have a reducing potential equivalent to a $CO:CO_2$ ratio of at least about $1:4\times10^3$, advantageously greater than about $1:10^2$. Reduction under these conditions of temperature and atmosphere provides a highly reactive metal product at commercially attractive rates.

The conditions of carbonylation are also an important aspect of the present invention. Superatmospheric, e.g., at least about 2 atmospheres, partial pressures of carbon monoxide must be employed to insure commercially feasible nickel recoveries, i.e., nickel recoveries of at least about 80% or more. Higher pressures are advantageously employed so that greater amounts of nickel can be recovered at commercially attractive rates. However, the partial pressures of carbon monoxide should not exceed about 15 atmospheres since at these high pressures the selectivity of the carbonylation of nickel relative to cobalt begins to noticeably fade. Most advantageously, carbon monoxide partial pressures between about 6 atmospheres and 12 atmospheres are employed to provide high nickel recoveries at fast rates without unduly affecting the selectivity of carbonylation. Carbonylation can be conducted at ambient temperatures but advantageously, temperatures between about 40° C. and 100° C. are employed to provide attractive rates of carbonylation. Higher temperatures should be avoided at these modest pressures in that they lower nickel extractant.

An advantageous embodiment of the present invention is the catalyzation of the nickel carbonylation and the suppression of the cobalt carbonylation reactions by providing the reduced metal with controlled amounts of sulfur in an active form, i.e., the sulfur must be uniformly distributed throughout the reduced metal. Sulfur or sulfur-bearing materials can be added either before or during reduction and/or carbonylation. When adding sulfur before reduction it can very advantageously be introduced to the aqueous slurry of the reducible nickel-cobalt compounds as a water-soluble or gaseous sulfide, e.g., sodium sulfide and potassium sulfide or hydrogen sulfide; or it can be added before or during reduction as elemental sulfur or as reducible sulfur compounds such as nickel sulfate; or the sulfur can be added before reduction as a solid sulfide material, for example, pyrites; or sulfur can be added during reduction in the form of reducible gaseous sulfur compounds, such as sulfur dioxide; or sulfur can be added after reduction preferably in the form of a reactive gaseous sulfide of the hydrogen sulfide or carbon oxysulfide type. In all cases, it is advantageous to insure uniform sulfur distribution. Besides catalyzing carbonylation, sulfur, when present in the active form, can also increase the extent of nickel recovery as nickel carbonyl. It is believed, although the invention is not limited thereto, that cobalt, as well as any iron present, forms a solid solution with nickel during reduction which renders the nickel less active during carbonylation and that sulfur reacting with the cobalt and iron thereby limits the degree and rate of nickel conversion to nickel carbonyl and minimizes the effects of these metals in the solid solution. The sulfur-bearing material is added in amounts so that the sulfur content of the reduced material is between about 0.05% and 5%. However, in order to realize the full catalytic effects of sulfur as well as the effects associated with the possible formation of cobalt and/or iron sulfide, the sulfur-bearing material is added in such amounts as to provide between about 0.2 mole and 2 moles of sulfur for each mole of cobalt and/or iron. In general the greater the amount of sulfur-bearing material added within the stated range the higher is the maximum reduction temperature (up to 400° C.) which can be employed, the lower is the required carbon monoxide pressure for carbonylation and the lower is the cobalt content of the volatilized nickel carbonyl. However, if excessive amounts of sulfur are added the ultimate nickel extraction is lowered because some nickel combines with sulfur to form sulfide which will not readily be reduced and carbonylated particularly at the modest pressures employed for carbonylation. Advantageously, therefore, sulfur-bearing compounds should be added to provide between about 0.75 and 1.5 moles sulfur for each mole of cobalt. If any copper is present in the reducible nickel compound or in the reduced metal, additional amounts of sulfur within the foregoing ratios should be provided.

Nickel carbonyl is collected from the carbonylation reaction by compressing and/or cooling the gases emanating from the carbonylation reactor. Compression and/or cooling of these gases provides a method for separating nickel carbonyl along with other metal carbonyls from carbon monoxide, and the carbon monoxide can thereafter be recycled to the carbonylation reactor. The liquid carbonyls can be fractionally distilled with nickel carbonyl, substantially free of iron and, of course, free of cobalt, being the first to be distilled. Commercial forms of substantially pure nickel can be produced by decomposing the distilled nickel carbonyl. For example, nickel carbonyl can be thermally decomposed to produce nickel pellets or nickel powder and carbon monoxide, which can be recycled to the carbonylation reaction.

The carbonylation reaction can be conducted in any apparatus which provides good gas-solid contact and can be conducted on a batch or continuous basis. For example, fluid bed reactors, rotary kilns or multiple hearth vessels can be employed as long as good gas seals are provided. Advantageously, whether the process is conducted on a batch or continuous basis, carbon monoxide, at the requisite partial pressures, is continuously added to and vented from the carbonylation reactor. The continuously vented carbon monoxide contains gaseous nickel carbonyl, which is collected as described hereinbefore. By continuously removing nickel carbonyl from the carbonylation reactor, the carbonylation reaction is rendered more efficient by making it possible for the reaction to more closely approach completion at a faster rate.

The carbonylation residue, which can have nickel to cobalt ratios as low as 1:3 or even lower, can be treated by conventional means to recover cobalt in a marketable form. For example, the residue can be redissolved and cobalt recovered by liquid or solid ion exchange techniques or cobalt and nickel can be further separated by selective precipitation after dissolution, e.g., by additions of water-soluble sulfides or by hydrogen reduction.

For the purpose of giving those skilled in the art a better appreciation of the advantages of the invention, the following illustrative examples are given:

EXAMPLE I

A head sample containing 41.2% nickel and 5% cobalt, i.e., a nickel to cobalt ratio of 8.25:1, which was obtained by heating a nickel- and cobalt-containing ammoniacal ammonium carbonate solution to distill ammonia and carbon dioxide and to precipitate basic carbonates of nickel and cobalt, was reduced in hydrogen for 4 hours at 300° C. Sufficient sulfur as a sodium sulfide ($Na_2S$) slurry was added before reduction to provide the reduced metal with a sulfur content of 3%, i.e., a sulfur to cobalt mole ratio of 0.54:1.

The reduced metal product was cooled without reoxidation and then treated with carbon monoxide at a partial pressure of 10 atmospheres and at a temperature of 60° C. for 17 hours. The carbonylation treatment extracted 98% of the nickel in the reduced metal product. The carbonylation residue contained 96% of the cobalt in the reduced metal product so that less than 4% of the cobalt reported in the nickel carbonyl, i.e., the nickel to cobalt ratio in nickel carbonyl was greater than 200:1.

For comparative purposes, a head material of the same composition was treated under the same conditions, including the sulfur addition, except that the carbonylation reaction was conducted under only one atmosphere of carbon monoxide. Under otherwise similar conditions only 64% of the nickel was extracted, even after 17 hours.

EXAMPLE II

This example confirms that lower reduction temperatures are essential to provide commercially acceptable nickel recoveries within reasonable times. A series of three head samples containing 41.2% nickel and 5.0% cobalt, i.e., a nickel to cobalt ratio of 8.25:1, which was obtained by heating a nickel- and cobalt-containing ammoniacal ammonium carbonate solution, were reduced in hydrogen for 4 hours at 300° C., 400° C. and 500° C. Sufficient sulfur as $Na_2S$ slurry was added before reduction to provide the reduced metal with a sulfur to cobalt mole ratio of 0.29, 0.38 and 0.27, respectively.

The reduced metal product was cooled without reoxidation and then treated with carbon monoxide at a partial pressure of 10 atmospheres and a temperature of 60° C. for 17 hours. The carbonylation treatment extracted 98.6%, 66.4% and 41.2% of the nickel in the products reduced at 300° C., 400° C. and 500° C., respectively. As shown in Table I, the extent of nickel volatilization depends markedly on the prereduction temperature; reduction temperatures lower than 300° C. will give similar extractions, however the reduction rate falls drastically.

TABLE I

| S:Co mole ratio | Carbonylation pressure, atm. of CO | Reduction temp., °C. | Ni extraction percent | |
|---|---|---|---|---|
| | | | 1 hour | 17 hours |
| 0.29 | 10 | 300 | 39.4 | 98.6 |
| 0.38 | 10 | 400 | 34.9 | 66.4 |
| 0.27 | 10 | 500 | 7.2 | 41.2 |

EXAMPLE III

A series of six samples of basic carbonate containing 41.2% nickel and 5% cobalt (obtained from ammoniacal ammonium carbonate solution) were slurried with aqueous sodium sulfide solution to give sulfur-cobalt mole ratios in the range 0.25 to 1.0 (as reported in Table II). The slurries were filtered and the sulfided carbonates were reduced with hydrogen for 4 hours at 300° C. The reduced products were cooled without reoxidation and then treated with carbon monoxide for 17 hours at 60° C. The six samples were run in 2 sets, 3 samples at 5 atmospheres of carbon monoxide, and 3 samples at 10 atmospheres of carbon monoxide, the samples being chosen such that a wide sulfur-cobalt range was covered for both sets.

Sulfur addition has three effects:

(1) Catalysis of the nickel volatilization reaction
(2) Suppression of cobalt carbonyl formation
(3) Lowering of the ultimate nickel extraction for high sulfur-cobalt ratios In Table II, the catalysis effect is shown clearly for the 5 atmosphere tests, sulfur-cobalt mole ratios of 0.25, 0.50 and 1.00 give nickel volatilizations of 49.4, 69.1 and 94.0, respectively. The effect of suppression of cobalt is similarly clearly demonstrated; the nickel-cobalt mole ratios from 135 to 1900 to 26,000 for sulfur-cobalt mole ratios of 0.25, 0.50 and 1.0, respectively. At the higher pressure (10 atmospheres) the catalytic effect of high sulfur is not as significant. The cobalt suppression still remains an important factor; as the sulfur-cobalt mole ratio is increased 0.32 to 0.52 to 0.73 the nickel-cobalt extraction ratio increases from 131 to 226 to 995, respectively, while the ultimate nickel extraction falls somewhat from 98.6 to 98.0 to 97.0, respectively.

TABLE II [1]

| S:Co mole ratio | Carbonylation pressure, atm. of CO | Residue, percent | | | | Extraction percent | | Ni/Co |
|---|---|---|---|---|---|---|---|---|
| | | Wt. | Ni | Co | S | Ni | Co | |
| 0.25 | 5 | 26.9 | 57.3 | 13.7 | 2.5 | 49.4 | 3.0 | 135 |
| 0.50 | 5 | 24.0 | 46.1 | 18.8 | 5.5 | 69.1 | 0.3 | 1,900 |
| 1.00 | 5 | 13.6 | 12.1 | 35.2 | 19.0 | 94.0 | 0.03 | 26,000 |
| 0.32 | 10 | 7.6 | 7.6 | 39.5 | 11.6 | 98.6 | 6.2 | 131 |
| 0.52 | 10 | 9.9 | 9.8 | 39.6 | 14.6 | 98.0 | 3.6 | 226 |
| 0.73 | 10 | 11.5 | 11.5 | 40.1 | 19.1 | 97.0 | 0.8 | 995 |

[1] Head sample: 41.2% Ni, 5.0% Co, 8.25 Ni/Co; Reduction, 4 hours at 300° C. in $H_2$; Volatilization, 17 hours.

EXAMPLE IV

A head sample of lateritic ore containing 1.18% Ni, 0.15% Co, and 45.1% Fe to which ½%, by weight, pyrite was added, was selectively reduced for 4 hours at 600° C. with a gas containing 40% carbon monoxide and 60% carbon dioxide. The reduced material was cooled without reoxidation to 60° C. and then treated with carbon monoxide at a partial pressure of 5 atmospheres for 17 hours. The carbonyl extracted residue was discharged into an ammoniacal ammonium carbonate solution containing 6%, by weight, ammonia and 4%, by weight, carbon dioxide. The residue was leached with this solution at 65° C. under conditions of aeration.

The carbonylation treatment extracted 91.5% of the nickel to give a carbonyl product containing, by parts, one nickel, 0.73 iron and less than 0.0001 cobalt, ammoniacal ammonium carbonate treatment leached a further 3.5% of the nickel, together with 81.5% of the cobalt. Distillation of the leach solution yielded a basic carbonate containing nickel, cobalt and iron in the approximate ratios 1:3:0.01; the carbonate may be treated by conventional methods for cobalt recovery.

A similar sample of lateritic ore together with ½%, by weight, pyrite was selectively reduced for 4 hours at 600° C. with a gas containing 40% carbon monoxide and 60% carbon dioxide. The reduced material was cooled without reoxidation to 65° C. and discharged into an ammoniacal ammonium carbonate solution containing 6%, by weight, ammonia and 4%, by weight, carbon dioxide. The residue was leached with this solution at 65° C. under conditions of aeration. This leaching extracted 93.5% of the nickel together with 80 to 82% of the cobalt. Distillation of this leach solution yielded a basic carbonate containing nickel, cobalt, and iron in the approximate ratios 1:0.11:0.01. The basic carbonate was slurried with an aqueous sodium sulfide solution to give a sulfur-cobalt mole ratio of 0.82:1 in the solids. The slurry was filtered and the basic carbonate reduced under hydrogen at 300° C. for 4 hours; the reduced material was cooled without reoxidation to 60° C. and then treated with carbon monoxide at a partial pressure of 6 atmospheres for 17 hours. The carbonylation treatment extracted 97% of the nickel originally present in the carbonate to give a carbonyl product containing, by parts, one nickel, 0.002 cobalt and 0.002 iron. The residue from the carbonylation contained nickel, cobalt and iron in the approximate ratios of 1:3:0.2, this residue can be treated by conventional methods for cobalt recovery.

It is clear from these two methods that selective reduction followed directly by ammonia leaching is advantageous in that the weight of material to be processed in the superatmospheric pressure reactor is less than 2% of the weight of the ore feed. Leaching followed by carbonylation is also advantageous in that the carbonyl product has a much lower iron content than that obtained by direct volatilization.

EXAMPLE V

This example confirms that the effect of the reduction temperature is not as drastic when sulfur contents within the preferred sulfur to cobalt ratios are employed. Four head samples of a basic carbonate precipitate which contained 44.8% nickel, 4.75% cobalt and 1.88% sulfur were reduced in hydrogen for four hours at 300° C., 325° C., 350° C. and 375° C. and, prior to reduction, sufficient sulfur was added to the respective samples to provide the reduced metal samples with sulfur to cobalt mole ratios of 0.99, 0.88, 0.93 and 0.85. The reduced metal samples were carbonylated under 10 atmospheres of carbon monoxide at 60° C. for 20 hours and the results are reported in Table III. It is apparent that when the advantageous sulfur to cobalt mole ratios are employed the effects of the reduction temperature on nickel extraction are not noticeable even up to 375° C. The effects of the reduction temperatures become more noticeable upon approaching 400° C. The results in Table III also show that higher reducing temperatures while lowering nickel extraction increase the ratio of nickel to cobalt extracted.

TABLE III

| Reduction temperature, ° C. | S:Co mole ratio | Extraction, percent | | Ratio of Ni: Co extracted |
|---|---|---|---|---|
| | | Ni | Co | |
| 300 | 0.99 | 98.8 | 6.7 | 139:1 |
| 325 | 0.88 | 96.5 | 5.8 | 158:1 |
| 350 | 0.93 | 96.8 | 5.3 | 172:1 |
| 375 | 0.85 | 91.3 | 3.5 | 246:1 |

It will be observed that the present invention provides a process for recovering nickel and cobalt from lateritic ores containing nickel, cobalt and iron which comprises selectively reducing the lateritic ore to reduce a preponderant part of the nickel and cobalt and only controlled amounts of iron; leaching the selectively reduced ore with an ammoniacal ammonium carbonate solution and with aeration to form a pregnant solution of nickel and cobalt containing only minor amounts of iron; distilling ammonia and carbon dioxide from the pregnant solution to precipitate basic carbonates of nickel, cobalt and iron; and reducing the basic carbonates in a reducing atmosphere at a temperature below about 375° C. to provide a reduced metal product and treating the reduced metal product with superatmospheric carbon monoxide partial pressures of less than about 15 atmospheres at a temperature below about 100° C. to yield nickel and iron carbonyls which are separated from the cobalt remaining with the reduced metal product.

Furthermore, the present invention provides a process for recovering nickel from lateritic ores containing nickel, cobalt and more than about 40% iron which comprises leaching the lateritic ore with sulfuric acid at temperatures between about 230° C. and 260° C. in an autoclave to provide an aqueous sulfate solution containing nickel, cobalt and only limited amounts of iron; adding a precipitant selected from a group consisting of bases and water-soluble carbonates to the sulfate solution to precipitate reducible compounds of nickel, cobalt and iron; separating the reducible compounds from the aqueous solution; reducing the separated reducible compounds in a reducing atmosphere at a temperature below about 375° C. to provide a reduced metal product; and treating the reduced metal product with superatmospheric carbon monoxide partial pressures of less than 15 atmospheres at a temperature below about 100° C. to yield nickel and iron carbonyls which are separated from the cobalt remaining in the reduced metal product.

The present invention is particularly applicable to the treatment of nickeliferous oxide ores. The leaching operation, whether acid or basic, can be conducted to maximize nickel and cobalt recovery in one step. After filtration of the leach liquor and nickel and cobalt precipitation therefrom, the bulk of the material to be treated in pressure equipment is substantially lowered, e.g., less than about 4% of the ore is reduced and carbonylated. Furthermore, the leaching operation recovers cobalt from the ore with nickel so that the bulk of the ore does not have to be subsequently treated for cobalt recovery. Another advantage of the process is that even if substantial portions of iron associated with the ore are leached and precipitated along with the nickel and cobalt, a pure nickel product, substantially free of cobalt and iron, is readily produced.

Although the present invention has been dsecribed in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for separating nickel from cobalt which comprises providing a nickel- and cobalt-containing aqueous solution; precipitating reducible compounds of nickel and cobalt from the aqueous solution; separating the reducible compounds from the aqueous solution; reducing the separated reducible compounds in a reducing atmosphere at a temperature below about 400° C. to provide a reduced metal product and treating the reduced metal product with superatmospheric carbon monoxide partial pressures of less than about 15 atmospheres at a temperature below about 100° C. to yield nickel carbonyl which is separated from the cobalt remaining with the reduced metal product.

2. A process as described in claim 1 wherein the reducible compounds are reduced at a temperature between about 225° C. and 375° C.

3. A process as described in claim 1 wherein the reduced metal product contains between about 0.2 mole and 2 moles of sulfur for each mole of cobalt to catalyse carbonylation.

4. A process as described in claim 1 wherein the reduced metal product contains between about 0.75 mole and 1.5 moles of sulfur for each mole of cobalt to catalyse carbonylation.

5. A process as described in claim 1 wherein carbon monoxide partial pressures of between about 6 atmospheres and 12 atmospheres are employed.

6. A process as described in claim 1 wherein the treatment with carbon monoxide is conducted at a temperature above about 40° C.

7. A process for separating nickel from cobalt contained in cobaltiferous and nickeliferous oxide ore which comprises leaching the ore to produce an aqueous solution containing nickel and cobalt; treating the aqueous solution to precipitate reducible compounds of nickel and cobalt; separating the reducible compounds from the aqueous solution; reducing the separated reducible compounds in a reducing atmosphere at a temperature below about 400° C. to provide a reduced metal product and treating the reduced metal product with superatmospheric carbon monoxide partial pressures of less than about 15 atmospheres at a temperature below about 100° C. to produce nickel carbonyl substantially separated from the cobalt remaining with the reduced metal product.

8. A process as described in claim 7 wherein the reducible compounds are reduced at a temperature between about 225° C. and 375° C.

9. A process as described in claim 7 wherein the reduced metal product contains between about 0.2 mole and 2 moles of sulfur for each mole of cobalt to catalyse carbonylation.

10. A process as described in claim 7 wherein the reduced metal product contains between about 0.75 mole and 1.5 moles of sulfur for each mole of cobalt to catalyse carbonylation.

11. A process as described in claim 7 wherein carbon monoxide partial pressures of between about 6 atmospheres and 12 atmospheres are employed.

12. A process as described in claim 7 wherein the treatment with carbon monoxide is conducted at a temperature above about 40° C.

13. A process for recovering nickel and cobalt from lateritic ores containing nickel, cobalt and iron which comprises selectively reducing the lateritic ore to reduce a preponderant part of the nickel and cobalt and only controlled amounts of iron; leaching the selectively reduced ore with an ammoniacal ammonium carbonate solution and with aeration to form a pregnant solution of nickel and cobalt containing only minor amounts of iron; distilling ammonia and carbon dioxide from the pregnant solution to precipitate basic carbonates of nickel, cobalt and iron; separating the basic carbonates from the solution; and reducing the basic carbonates in a reducing atmosphere at a temperature below about 375° C. to provide a reduced metal product and treating the reduced metal product with superatmospheric carbon monoxide partial pressures of less than about 15 atmospheres at a temperature below about 100° C. to yield nickel and iron carbonyls which are separated from the cobalt remaining with the reduced metal product.

14. A process as described in claim 13 wherein the carbonyls are decomposed to form a metal product and carbon monoxide which is recycled to the carbon monoxide treatment.

15. A process as described in claim 13 wherein the reducible compounds are reduced at a temperature between about 225° C. and 340° C.

16. A process as described in claim 13 wherein the reduced metal product contains between about 0.2 mole and 2 moles of sulfur for each mole of cobalt to catalyse carbonylation.

17. A process as described in claim 13 wherein the reduced metal product contains between about 0.75 mole and 1.5 moles of sulfur for each mole of cobalt to catalyse carbonylation.

18. A process as described in claim 13 wherein carbon monoxide partial pressures of between about 6 atmospheres and 12 atmospheres are employed.

19. A process as described in claim 13 wherein the treatment with carbon monoxide is conducted at a temperature above about 40° C.

20. A process as described in claim 13 wherein nickel and iron carbonyls emanating from the carbon monoxide treatment are cooled to form a liquid solution of metal carbonyls which is fractionally distilled to produce substantially pure gaseous nickel carbonyl.

21. A process as described in claim 20 wherein the carbonyls are decomposed to form a metal product and carbon monoxide which is recycled to the carbon monoxide treatment.

22. A process for recovering nickel from lateritic ores containing nickel, cobalt and more than about 40% iron which comprises leaching the lateritic ore with sulfuric acid at temperatures between about 230° C. and 260° C. in an autoclave to provide an aqueous sulfate solution containing nickel, cobalt and only limited amounts of iron; adding a precipitant selected from a group consisting of bases and water-soluble carbonates to the sulfate solution to precipitate reducible compounds of nickel, cobalt and iron; separating the reducible compounds from the aqueous solution; reducing the separated reducible compounds in a reducing atmosphere at a temperature below about 375° C. to provide a reduced metal product; and treating the reduced metal product with superatmospheric carbon monoxide partial pressures of less than 15 atmospheres in a temperature below about 100° C. to yield nickel and iron carbonyls which are separated from the cobalt remaining in the reduced metal product.

23. A process as described in claim 22 wherein nickel and iron carbonyls emanating from the carbon monoxide treatment are cooled to form a liquid solution of metal carbonyls which is fractionally distilled to produce substantially pure gaseous nickel carbonyl.

24. A process as described in claim 22 wherein the carbonyls are decomposed to form a metal product and carbon monoxide which is recycled to the carbon monoxide treatment.

25. A process as described in claim 22 wherein the reducible compounds are reduced at a temperature between about 225° C. and 340° C.

26. A process as described in claim 22 wherein the reduced metal product contains between about 0.2 mole and 2 moles of sulfur for each mole of cobalt to catalyse carbonylation.

27. A process as described in claim 22 wherein the reduced metal product contains between about 0.75 mole and 1.5 moles of sulfur for each mole of cobalt to catalyse carbonylation.

28. A process as described in claim 22 wherein carbon monoxide partial pressures of between about 6 atmospheres and 12 atmospheres are employed.

29. A process as described in claim 22 wherein the treatment with carbon monoxide is conducted at a temperature above about 40° C.

References Cited

UNITED STATES PATENTS

| | | | |
|---|---|---|---|
| 3,079,235 | 2/1963 | Dakli et al. | 23—203 C |
| 2,757,077 | 7/1956 | Lewis et al. | 75—.5 AA |
| 3,100,700 | 8/1963 | Hills | 75—63 |
| 2,805,939 | 9/1957 | Schaufelberger | 75—108 |

GEORGE T. OZAKI, Primary Examiner

U.S. Cl. X.R.

23—203 C; 75—82, 103, 108, 115, 119